United States Patent [19]
Duncan

[11] Patent Number: 5,147,095
[45] Date of Patent: Sep. 15, 1992

[54] VEHICLE TOW BAR

[76] Inventor: Lee H. Duncan, 88806 Greenhill Rd., Eugene, Oreg. 97402

[21] Appl. No.: 698,742

[22] Filed: Feb. 1, 1991

[51] Int. Cl.$^5$ ............................................. B60D 13/00
[52] U.S. Cl. ................................ 280/491.4; 280/491.2
[58] Field of Search ............... 280/491.4, 491.3, 491.1, 280/491.2

[56] References Cited

U.S. PATENT DOCUMENTS 4,266,800  5/1981  Hawkins ........................... 280/491.4

FOREIGN PATENT DOCUMENTS

257663  4/1964  Netherlands ..................... 280/491.2

Primary Examiner—Robert P. Olszewski
Assistant Examiner—Kenneth Noland
Attorney, Agent, or Firm—Olson & Olson

[57] ABSTRACT

An easily and quickly demountable and stowable vehicle tow bar comprises a substantially Y-shaped frame, the angled towing arms of which are pivoted at a base member for lateral movement relative to one another, and the forwardly projecting center arm, or hitch-mounting reach member, is mounted on the base member for releasable sliding movement relative thereto between an inoperative, extended condition and an operative, retracted condition in which its rear end portion extends between the angled towing arms, link members interconnecting the rear terminal end of the reach member and the opposite towing arms to maintain the reach immovably in position extending equidistantly between the arm members when the reach is in locked, retracted condition for towing.

7 Claims, 7 Drawing Sheets

VEHICLE TOW BAR

BACKGROUND OF THE PRIOR ART

This invention relates to vehicle tow bars, and more particularly to a novel collapsible tow bar which is arranged for quick and easy attachment to and removal from a vehicle to be towed, while also facilitating the hitching of a vehicle to be towed to a tow car.

Tow bars are known in the art, and are finding increasing popularity particularly among RV enthusiasts who often tow a car behind them so that they may have transportation other than their large, cumbersome campers when they have put in for a stay at a park or the like. Such conventional tow bars typically in use generally comprise a mounting bracket extending laterally across the front of the car and mounted to the frame or the bumper. An A-frame tongue portion is attached at its wide end to laterally spaced apart points on the mounting bracket and provided for vertically pivotal movement thereon so as to accommodate upward and downward movement between the towing vehicle and the vehicle towed. The closed end of the A-shaped tongue portion of course mounts the trailer hitch coupler, which receives the corresponding ball component mounted on the tow vehicle. When not in use, the assembly must either be unbolted and removed from the vehicle before driving, or the tongue portion pivoted upwardly and locked into position with the hitch coupler projecting well above the hood of the car forwardly of the bumper thereof.

Alternatively, collapsible tow bars have been provided heretofor, and are arranged to be folded when not in use so that they lay laterally across the front of the towed car and secured there during all times that the car is not being towed. Aside from the permanently added weight on the front end of the car, these male permanent fixtures can be attractive to vandals, or subject to deterioration from the elements during their unused times which represent the bulk of their time in place on a vehicle, and commonly end up rather dirty and messy when it comes time to eventually use them again. Typical of this type of tow bar are those disclosed in my earlier U.S. Pat. No. 4,577,883 and in U.S. Pat. Nos. 3,105,706 and 3,281,163.

While these later model tow bars do provide the extreme advantage of affording the user a great deal more ease in hooking up to a towing vehicle than the rigid A-frames of the earlier art, it has been found that there is a need for such versatile tow bars that are also configured specifically for quick and easy removal from and attachment to the front of a car to be towed so that when not in use the tow bar assembly itself may be uncoupled from the towed vehicle and swung against the rear end of the towing recreational vehicle and secured for storage, or it may also be disconnected from the towing vehicle and conveniently and safely stowed away as in the utility compartment of the recreational vehicle.

SUMMARY OF THE INVENTION

In its basic concept, this invention provides a tow bar which is arranged to be quickly and easily attached to and removed from the front of a vehicle to be towed behind another, and also is arranged for pivotal and telescopic movement to facilitate rapid and easy connection between vehicles that are not precisely aligned relative to each other prior to connection of the tow bar.

It is by virtue of the foregoing basic concept that the principal objective of this invention is achieved; namely, the provision of a vehicle tow bar which overcomes the aforementioned disadvantages and limitations of those tow bars previously provided.

Another object of this invention is the provision of a vehicle tow bar of the class described which is collapsible and easy stowable when not in use for extended periods of time.

Another object and advantage of this invention is the provision of a vehicle tow bar of the class described which may also be collapsed and stored on the towing vehicle between uses.

Yet another object of this invention is the provision of a vehicle tow bar of the class described which is of simplified construction for economical manufacture and is also particularly light in weight for ease in connection, disconnection and storing.

Still another object of this invention is the provision of a vehicle tow bar of the class described which eliminates the requirement of the tow bar's permanent mount and storage on the front end of the vehicle to be towed.

The foregoing and other objects and advantages of this invention will appear from the following detailed description, taken in connection with the accompanying drawings of a preferred embodiment.

DESCRIPTION OF THE PREFERRED EMBODIMENT

Figure 1:
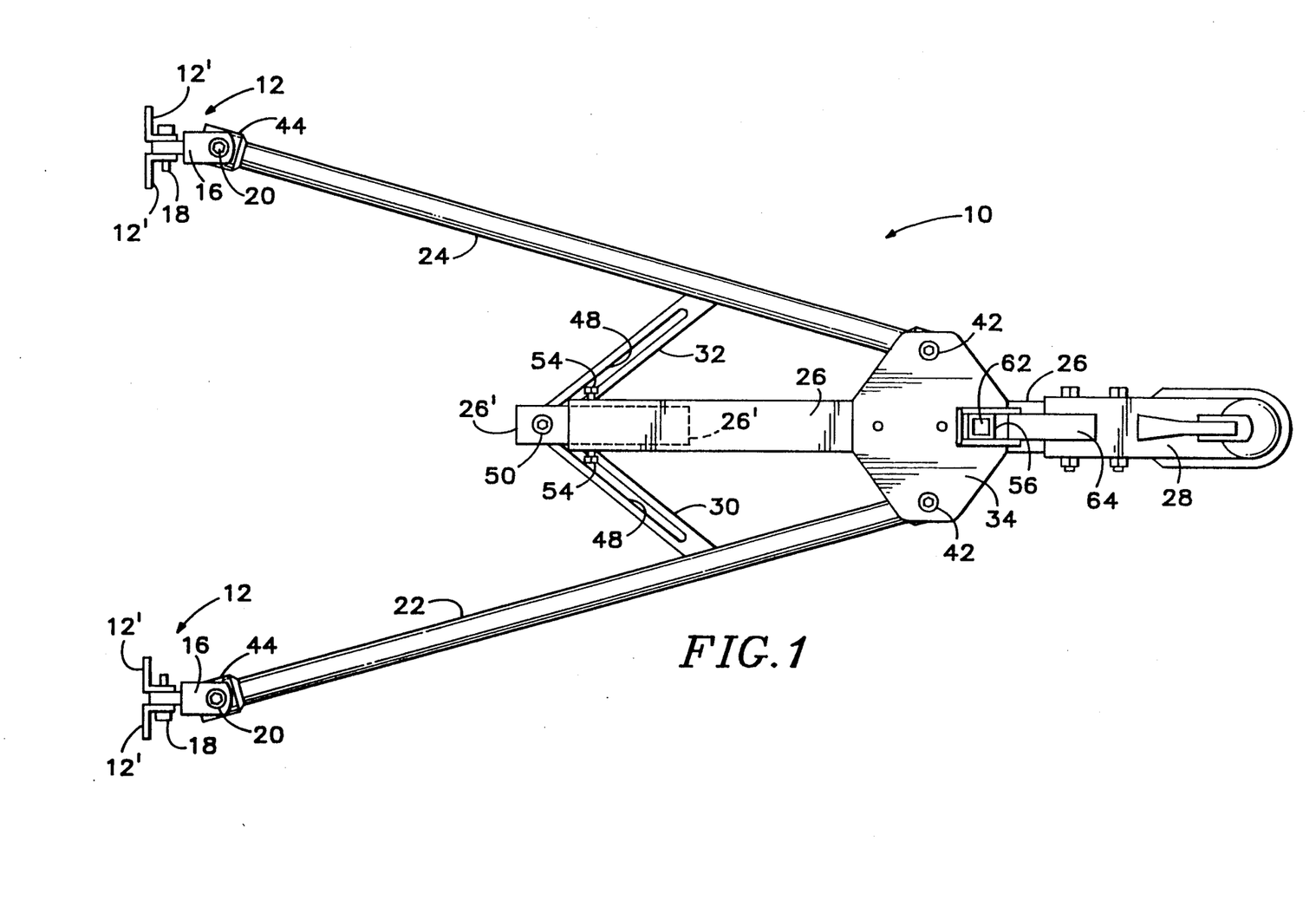
FIG. 1 is a top plan view of a vehicle tow bar embodying the features of this invention, the tow bar being shown in operational, towing condition.
Figure 9:
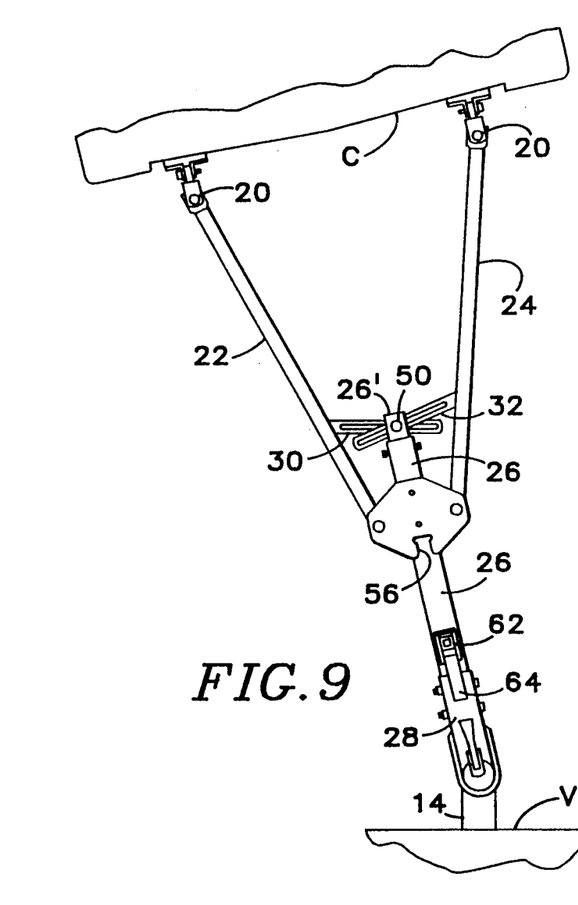
Figure 10:
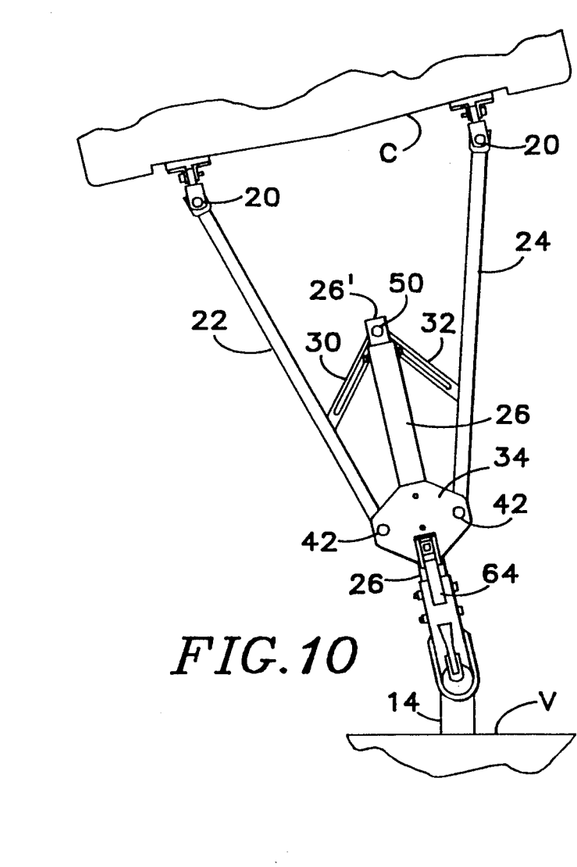

A vehicle tow bar is indicated generally at 10 in FIG. 1, and is provided for releasable attachment to the front end of a car C to be towed and to the rear end of a towing vehicle V as seen in FIGS. 9 and 10. Means by which the tow bar may be anchored to the front end of the car may comprise a pair of mounting brackets 12 which may be configured for spaced apart mounting on the front frame, bumper or other suitable part of the car to be towed. The towing vehicle V mounts a trailer hitch ball component 14 as is typical.

In the embodiment illustrated, the mounting brackets 12 provide means by which the tow bar is permitted pivotal movement vertically and horizontally on the front end of the car to be towed. As shown, each bracket 12 includes a base member 12' configured for mounting on a car, the base member configured to pivotally mount one end of a connector member 16 as by pivot pin 18 In this embodiment, the connector member 16 is mounted for vertical movement relative to the front end of the car. As will be explained later, the connector member 16 is configured at its other end to releasably mount, as by pivot pin 20, the tow arm members of the tow bar for laterally pivotal (horizontal) movement relative to the front end of the car.

Since the rotational axis of pin 18 is horizontal and the rotational axis of pin 20 is vertical, they combine to provide a universal pivotal movement.

Figure 2:
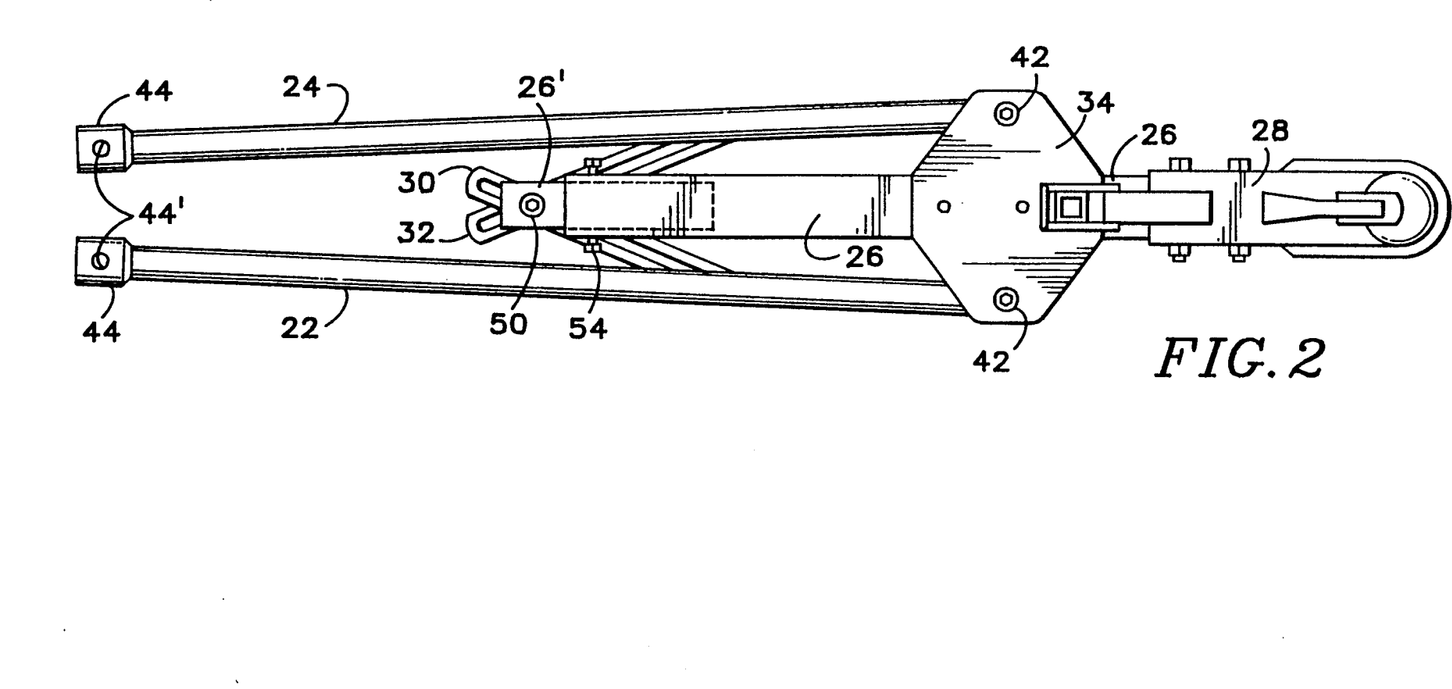
FIG. 2 is a plan view of the tow bar of FIG. 1 shown in collapsed condition for storage.
Figures 3, 4:
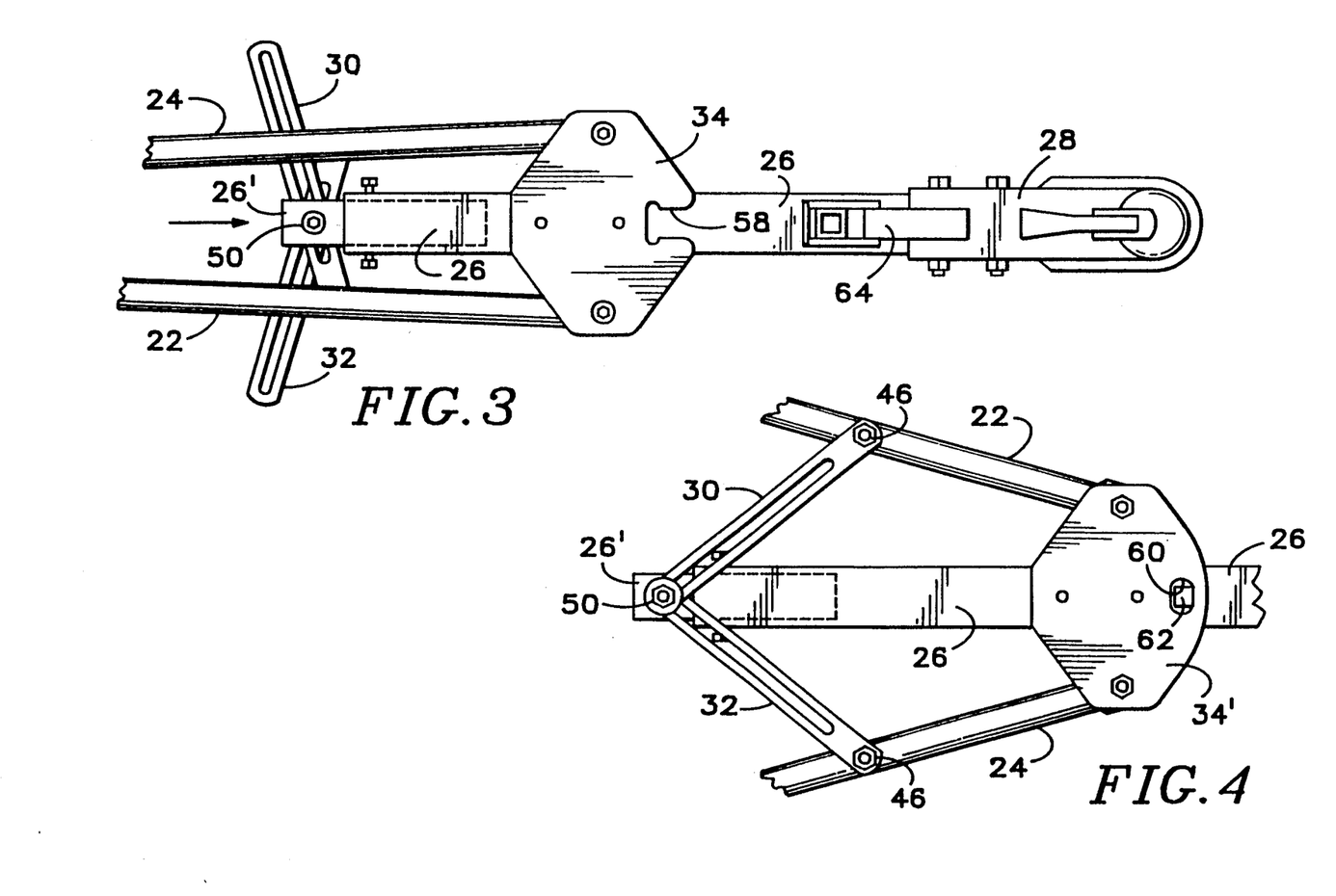
FIG. 3 is a fragmentary plan view of the vehicle tow bar shown in FIG. 2, but with the reach member unlocked and in partly extended condition.
FIG. 4 is a fragmentary bottom plan view of the center portion of the vehicle tow bar of FIG. 1.

In a broad sense, the tow bar embodied herein may be described as substantially Y-shaped in overall configuration, the angled arm members 22, 24 being mounted at their juncture with the center arm 26 of the Y for laterally pivotal movement between the extended and collapsed conditions illustrated in FIGS. 1 and 2. The center arm 26 is mounted at the juncture of the Y for sliding movement, as seen in FIGS. 2 and 3, through a base member described hereinafter, between the angled arm members 22, 24. The arm 26 projects forwardly through the base member (and completes the Y configuration of the tow bar) and mounts the socket component 28 of a conventional ball and socket trailer hitch coupler. The arm thus functions as an elongated reach. The rear telescopic end section 26' of the center arm 26 mounts link means illustrated herein as strap or bar members 30, 32 which engage the angled arm members 22, 24 at a predetermined position along their lengths, for reasons which will be explained later.

Figures 5, 5A:
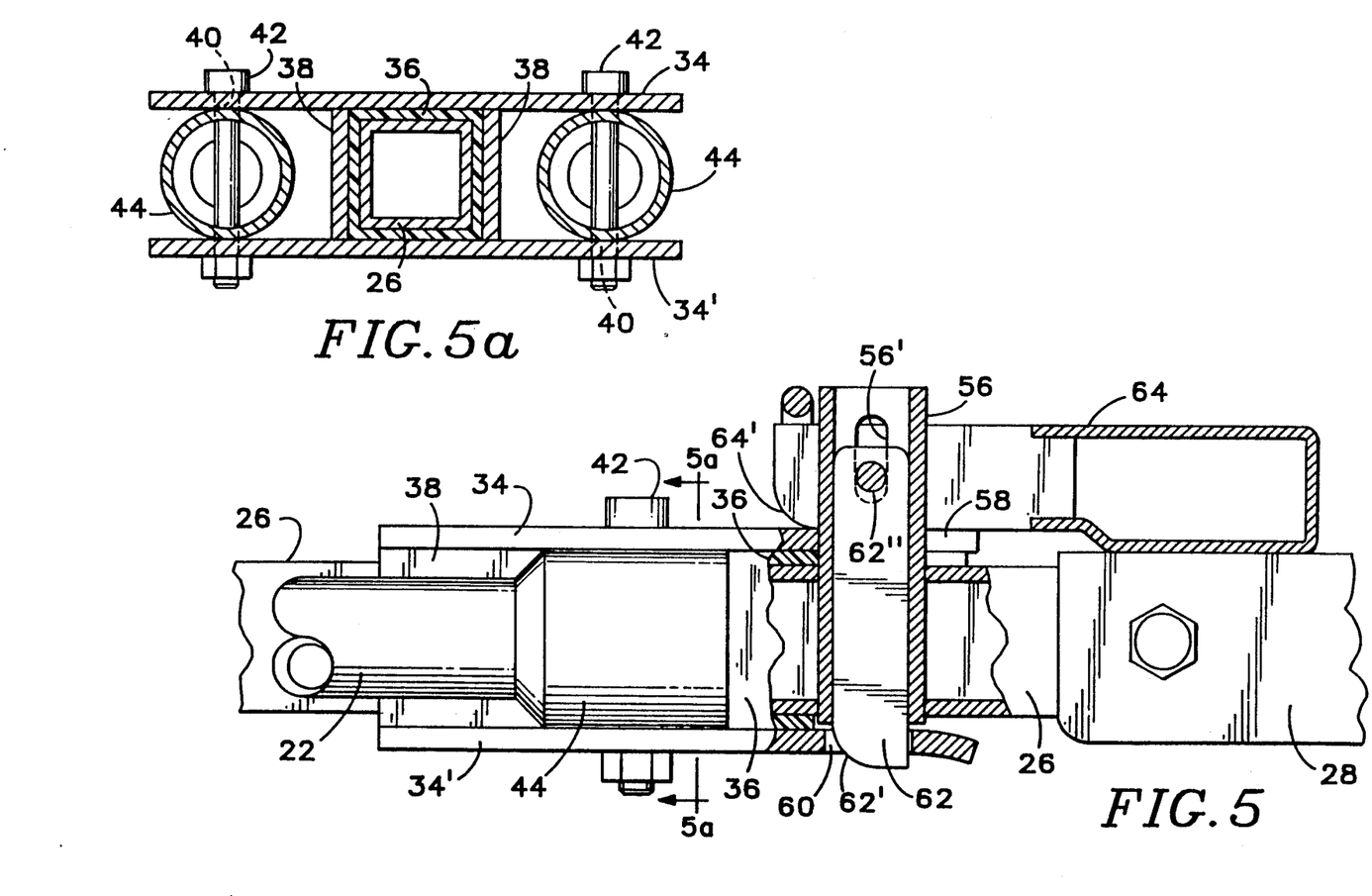
FIG. 5 is a fragmentary side elevation of the base member and locking mechanism associated with the reach member, parts being broken away to show internal detail.
FIG. 5a is a sectional view through the base member taken along the line 5a–5a in FIG. 5.

With the foregoing overview of the basic construction of the vehicle tow bar of this invention in mind, a detailed description of the structure of the invention embodied herein is more readily understood, and in this regard, attention is first directed primarily to FIGS. and 5 wherein a base member 34 is shown and provides means by which the aforementioned arm members are mounted at their juncture as previously explained. As illustrated best in FIG. 5a, the base member 34 in this embodiment comprises a pair of spaced apart plates 34, 34' which are securely attached together by a pair of vertical plate members 38 disposed so as to form between them an open-ended space of specific, pre-determined dimensions. Preferably, the inner surface walls of this open-ended, box-like space mount friction-reducing material 36 configured and dimensioned so as to provide a central, longitudinal opening through the base member for sliding reception of the center arm 26. Aligned bores 40 are provided through the plates 34, 34' to receive pivot bolts 42 which provide means for mounting the tow arm members 22, 24 which will now be described.

The pivotal towing arm members 22, 24 provide means by which the base member 34 is connected to the front end of a vehicle to be towed, and are preferably formed of standard, suitable gauge tubular metal of a predetermined length. In the embodiment illustrated, the arm members are provided with strengthened, enlarged end fittings 44 configured to be received in relatively close tolerance within the confines between the plates 34, 34' (FIGS. 5, 5a). Bores (not shown) are provided therethrough to align with the bores 40 in the base member and to receive the pivot pin or bolt 42 which secures the one end of the arm members in position while permitting their lateral movement shown in FIGS. 1 and 2. The opposite ends of the arm members are provided with similar end fittings 44 configured for reception within the confines of the U-shaped connector members 16 pivotally mounted on the front end of the car as previously described, and aligned bores 44' (FIG. 2) are provided therethrough for releasable reception of the pivot pins 20 previously described.

The center arm 26, hereinafter referred to as the reach 26, in this embodiment comprises a length of hollow box beam having outside dimensions which are slightly smaller than the inside dimensions of the open channel through the base member 34. This close tolerance in respective dimensions is required in order to permit free sliding movement of the reach 26 within the channel while preventing any undesirable vertical and lateral movement of the reach that might result in excessive wear, noise and vibration of the reach during use.

The longitudinally elongated, reach 26 is shown mounting on its forward end the socket type hitch coupler 28 of a conventional ball and socket trailer hitch assembly, the rear end portion of the reach extending through the base member 34 and rearwardly therefrom between the tow arm members 22 and 24 a distance that is selected as being adequate to provide a range of sliding movement sufficient to accomplish the desired operation as will be described later.

The drawings show that each towing arm member 22, 24 mounts, at a predetermined position along its length, one end of a link member 30, 32. The opposite end of the link member being configured for attachment to the terminal end of the telescopic end portion 26'. In the embodiment illustrated, these link members are each configured as a longitudinally elongated strap or bar mounted by pivot bolts 46 (FIG. 4) at one of its ends to its respective arm member and provided with a centrally disposed, longitudinally elongated slot 48 extending along its length between its pivot mount and its other terminal end which is configured, as shown, to engage the terminal end of the telescopic reach end member 26'. In this particular embodiment, as seen in FIGS. 3 and 4, the link members are secured to the terminal end of the reach 26' by bolt 50 provided on the reach and configured to extend through the slots 48 in each link member and thereby capture the link members for confined movement of the latter relative to the end of the reach. In this manner, there is a direct yet adjustably flexible connection between the laterally pivotal towing arm members 22, 24 and the terminal end of the telescopic reach member 26'. This telescoping reach member 26' is captured slidably within the hollow confines of the reach 26 as shown and secured in desired positions of longitudinal extension from the end of the reach by friction clamp screws 54. In this manner, fine adjustments of the length of the terminal end of the reach may be made, and hence the maximum lateral spread of the tow arm members 22, 24 equidistant from the centrally disposed reach 26 may be selected and limited, the purpose of which will be explained later.

Alternatively, the telescopic reach section 26' may be omitted and the link bolt 50 secured to the rear end of the reach 26.

It will be understood that, although the pivotal link members 30, 32 described herein are illustrated in the preferred form for providing flexible means for interconnecting the tow arm members with the reach, other such means are equally suitable for the purpose, and wholly satisfactory alternatives may include rods and appropriate connector fittings, as well as chains or cables of predetermined length. This will become apparent later in the description of the link members' function contained in the description of the operation of the tow bar assembly.

Figure 6:
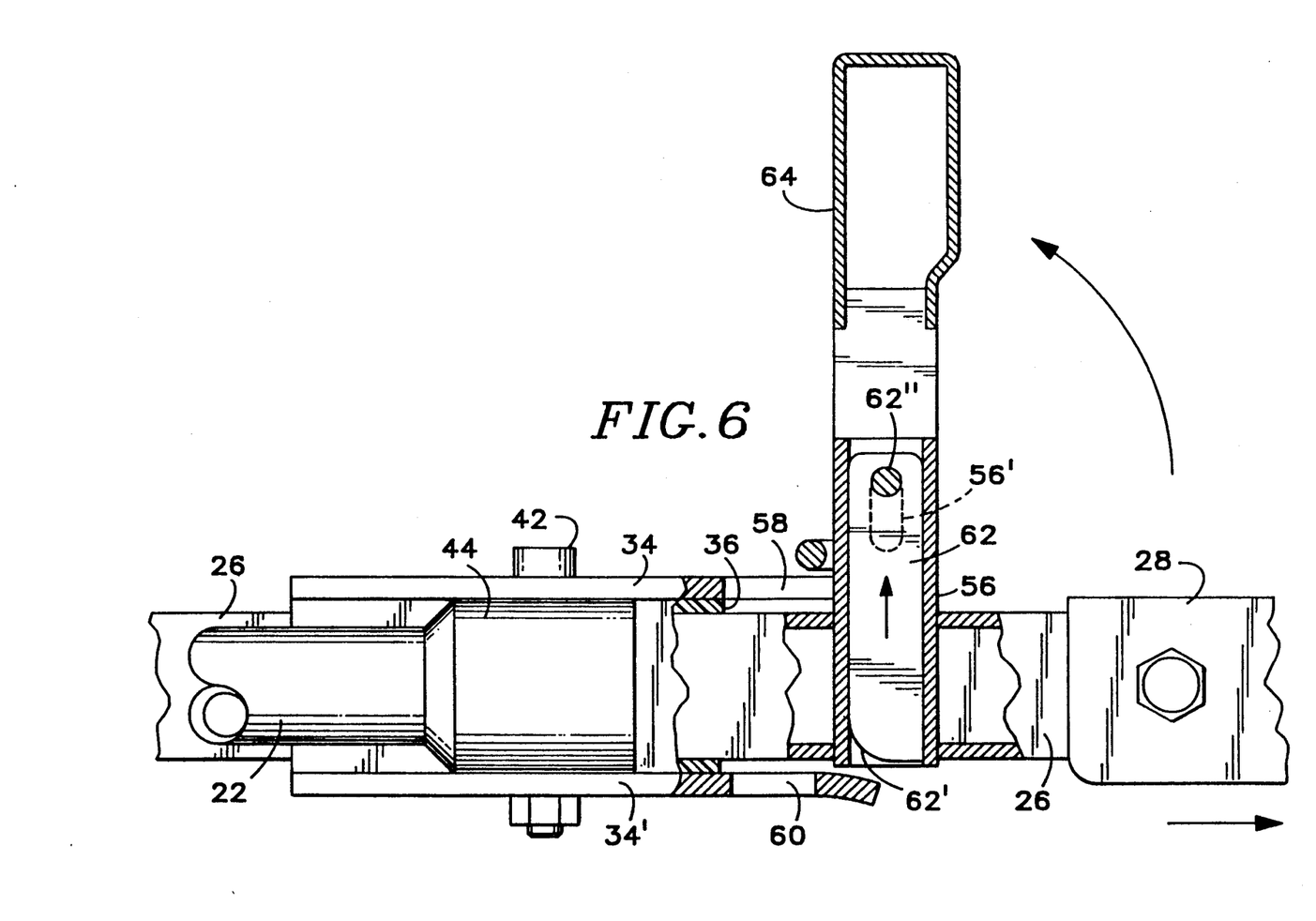
FIG. 6 is a fragmentary side elevation similar to FIG. 5 but showing the reach locking mechanism in unlocked condition.

Means is provided to releasably lock the telescoping reach member 26, 26' in the retracted condition of FIGS. 1 and 2. Referring to FIGS. 5 and 6, the reach 26 includes aligned openings through its opposite top and bottom side walls. A plunger barrel 56 is secured to the reach so as to extend vertically through the openings as shown. The barrel is positioned to align with a slot 58 and an enlarged opening 60 provided in the base member's top and bottom plates 34, 34', respectively. The barrel 56 is configured to carry a plunger 62 for free vertical movement within the barrel, and a plunger actuating lever 64 interconnects the movable plunger and its confining barrel to manually move the plunger vertically within the barrel. In the embodiment illustrated, the upper end of the hollow plunger barrel 56 includes a pair of aligned slots 56' through its lateral side walls, and the plunger 62 mounts a laterally extending pin 62" arranged to be freely captured within the slots 56' for confined movement of the pin 62" and associated plunger 62 vertically. The plunger actuating lever 64 engages the pin 62" and is configured with a rounded end 64' opposite its handle end so that vertical movement of the handle rotates the lever on its rounded end 64' about the axis of the pin 62" (FIGS. 5 and 6) to effect a cam action of the pin 62" within the slot 56' which moves the plunger 62 vertically within the barrel.

When the reach is in the fully retracted conditions of FIGS. 1, 2 and 4, the barrel 56 is positioned within the slot 58 through the top plate 34 of the base member and the plunger is captured within the confines of the opening 60 through the bottom plate, thereby securely locking the reach against sliding movement relative to the base member 34, 34' into the extended condition of FIG. 3. The bottom end 62' of the plunger is preferably rounded on its rearward facing surface in order to permit it to automatically ride up and over the bottom plate and fall into its latched opening 60 when the reach is fully retracted, in the same fashion as a conventional door latch is permitted to automatically function as the door is closed into its door jamb. Operation of the lever 64 moves the plunger vertically upward to clear the latch opening 60 and thereby permits the reach to slide in the base member. For safety and security, suitable locking means (not shown) may be provided to releasably lock the plunger in downwardly extended condition against vertical movement when the reach is in locked, retracted, towing condition in order to insure against inadvertent uncoupling of the reach from the base member during towing.

Figure 7:
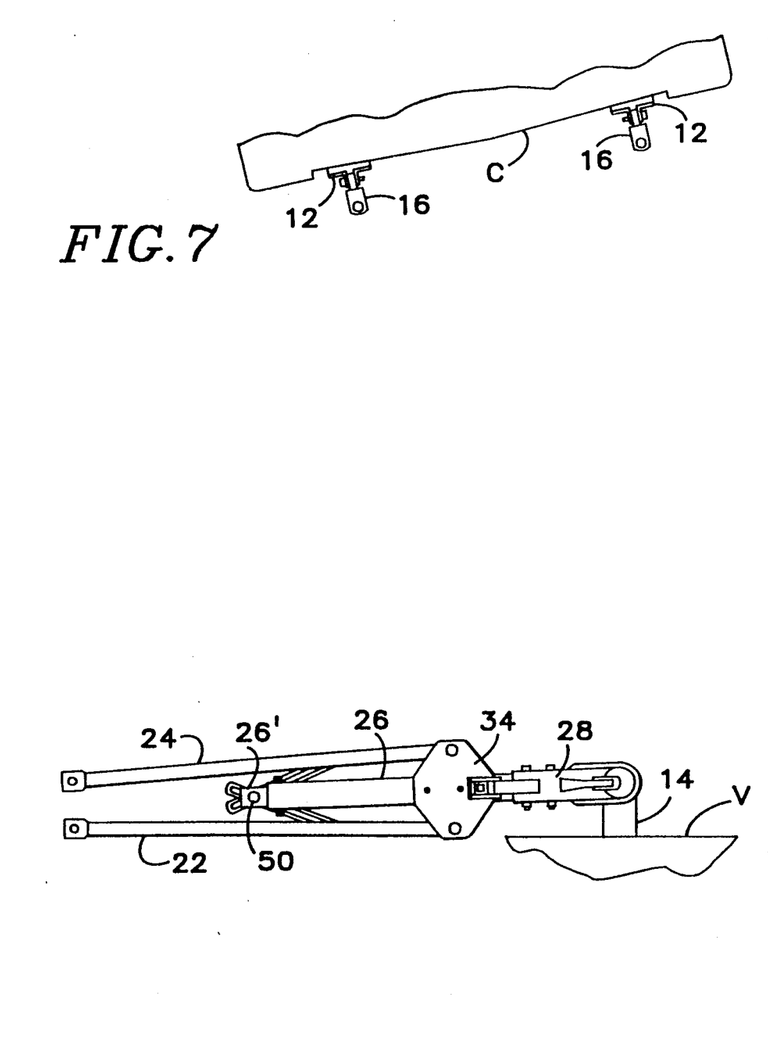
FIGS. 7–10 are fragmentary top plan views of the vehicle tow bar of this invention on a towing vehicle and showing step-by-step the hookup procedure of the tow bar to a vehicle to be towed.

Having thus described the basic construction of a vehicle tow bar of this invention, reference is made to FIGS. 7-10 of the drawings for a description of the operation of the tow bar. Schematically, there is shown the front end of a car C to be towed, and a portion of the rear end of a towing vehicle V having a conventional ball type trailer hitch component 14 mounted thereon. FIG. 7 shows the towing vehicle V mounting the tow bar of this invention in inoperative condition on the hitch 14 and collapsed and secured against the bumper. A car C to be towed permanently mounts the pivotal mounting brackets 12-16 at appropriate spaced apart positions on its front end, and the car is moved into the vicinity behind the tow vehicle.

Figure 8:
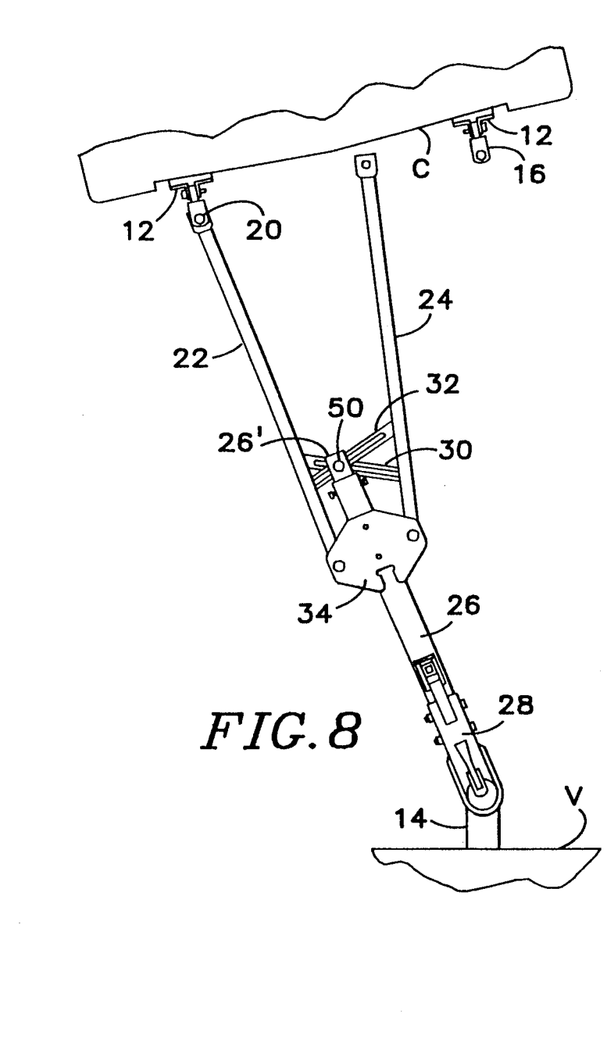

FIG. 8 shows the towing arm end of the tow bar released from its storage mount to the bumper of the tow vehicle and swung around on the trailer hitch ball 14 and the reach 26 extended from the base member in order to bring the end fitting of one towing arm 22 into connection with the corresponding coupler 16 mounted on the car to be towed. Pivot pin 20 is inserted through the aligned bores to connect the leg 22 to the corresponding car mounting bracket. Suitable locking means such as cotter pin (not shown) may be provided to assure that the pin 20 remains in position.

In FIG. 9, the other towing arm 24 has been manipulated into position in which it is coupled to the other vehicle mounting bracket with a pin 20, as previously described in connection with towing arm 22.

With the two towing arms 22, 24 thus secured in position on the front end of the car C to be towed, the car is moved forwardly (FIG. 10) which moves the base member 34 forwardly along the reach until it locks into the fully retracted condition shown. The reach 26, 26' is automatically moved into precisely centered position between the angled towing arm members 22, 24 by virtue of the controlling link members 30, 32 which, when the reach is in locked condition, also prevent any side-to-side movement of the reach during towing, thus providing an extremely rigid and secure towing assembly when locked as in FIG. 10. The vehicles, as shown in FIG. 10, are ready to proceed, and as mentioned earlier, safety locks and chains may be provided as desired or required.

As mentioned previously, the tow bar embodied herein includes means for fine adjustment of the effective length of the reach 26, and hence the position of its connection with the link members 30, 32. As will be understood, preliminary to its first use on a car to be towed, the tow bar will be adjusted during original installation to fit the particular car being serviced. Once the mounting brackets are installed on the car, the tow bar is connected and the reach member 26' is telescopically adjusted relative to reach member 26 to dispose the link members 30, 32 so that they are at their fully extended condition (FIG. 1) and the reach extends equidistantly between the arm members and the reach is fully retracted and locked. The link members thus are arranged to reach their fully extended, taut limit when the arms are spread apart the distance required to connect to the vehicle mounting brackets on the car and the reach is in full retracted and locked condition. In this manner, the link members define and limit the maximum lateral spacing permitted between the link connector means on the opposite arm members, and, when that distance is fixed by the attachment of the arm ends to a car, maintain the rearwardmost end of the reach rigidly and immovably in centrally disposed position between the arms when the reach is retracted fully into its rearwardmost, locked position for towing. This one time initial adjustment permits the tow bar to accommodate various spacings between the vehicle mounting members 12-18 and also allows the tow bar to be readjusted in order to accommodate its use on replacement cars that are towed behind an owner's recreational vehicle.

From the foregoing it will be apparent to those skilled in the art that various changes other than those previously described may be made in the size, shape, type, number and arrangement of parts described hereinbefore without departing from the spirit of this invention and the scope of the appended claims.

Having thus described my invention in the manner in which it may be used, I claim:

1. A vehicle tow bar, comprising:
   a) a base member having a central longitudinal opening therethrough,
   b) an elongated reach member extending slidably through the longitudinal opening in the base member and having forward and rearward ends,
   c) a hitch component on the forward end of the reach member configured for releasable coupling to a complimentary hitch component on a towing vehicle,
   d) a pair of elongated arm members secured pivotally at one end to the base member on opposite lateral sides of the reach member for lateral pivotal movement toward and away from said reach member,
   e) connector means on the ends of the arm members opposite the base member configured for releasable pivotal attachment to laterally spaced positions on one end of a vehicle to be towed,
   f) lock means releasably interengaging the base member and reach member for securing said members together when the reach member is moved to its rearwardmost position relative to the base member and for disengaging said members for slidably moving said reach member forwardly of said rearwardmost position, and
   g) link means interconnecting the reach member adjacent the rearward end thereof and each of the arm members intermediate the ends of said arm members, the link means being configured to allow the arm members to pivot on the base member toward and away from the reach member independently of each other and to limit the lateral spacing between the connector means on the arm members to a predetermined maximum.

2. The vehicle tow bar of claim 1 wherein the link means comprises a pair of elongated bars each having an elongated slot therein, first pivot means on each arm member, and second pivot means adjacent the rearward end of the reach member, each link bar being connected to one of said first and second pivot means independently of said slot, the other of said first and second pivot means extending freely through said slot in said link bar.

3. The vehicle tow bar of claim 2 wherein each link bar is connected to a different one of said first pivot means independently of said slot, the second pivot means extending freely through said slot in each link means.

4. The vehicle tow bar of claim 1 wherein the reach member includes forward and rearward telescopic sections configured for longitudinal adjustment, and securing means releasably interconnecting said telescopic sections for releasably securing said sections together in positions of longitudinal adjustment, the link means being connected to the rearward reach section.

5. The vehicle tow bar of claim 4 wherein the link means comprises a pair of elongated bars each having an elongated slot therein, first pivot means on each arm member, and second pivot means adjacent the rearward end of the rearward section of the reach member, each link bar being connected to one of said first and second pivot means independently of said slot, the other of said first and second pivot means extending freely through said slot in each link bar.

6. The vehicle tow bar of claim 5 wherein each link bar is connected to a different one of said first pivot means independently of said slot, the second pivot means extending freely through said slot in each link bar.

7. The vehicle tow bar of claim 1 wherein the lock means comprises a lock plunger extending slidably through the reach member, and a plunger-receiving opening in the base member arranged to removably receive said plunger when the reach member is moved to its rearwardmost position relative to the base member.

* * * * *